US011478956B2

(12) United States Patent
Santoni

(10) Patent No.: US 11,478,956 B2
(45) Date of Patent: Oct. 25, 2022

(54) COMPOSITE MANUFACTURING

(71) Applicant: McLaren Automotive Limited, Woking (GB)

(72) Inventor: Claudio Santoni, Woking (GB)

(73) Assignee: McLaren Automotive Limited, Surrey (GB)

( * ) Notice: Subject to any disclaimer, the term of this patent is extended or adjusted under 35 U.S.C. 154(b) by 0 days.

(21) Appl. No.: 16/757,177

(22) PCT Filed: Oct. 19, 2018

(86) PCT No.: PCT/GB2018/053037
§ 371 (c)(1),
(2) Date: Apr. 17, 2020

(87) PCT Pub. No.: WO2019/077369
PCT Pub. Date: Apr. 25, 2019

(65) Prior Publication Data
US 2020/0338787 A1    Oct. 29, 2020

(30) Foreign Application Priority Data
Oct. 20, 2017   (GB) ..................... 1717317

(51) Int. Cl.
*B29C 70/54*   (2006.01)
*B29B 11/16*   (2006.01)
(Continued)

(52) U.S. Cl.
CPC ............ *B29B 11/16* (2013.01); *B29C 70/382* (2013.01); *B29C 70/18* (2013.01); *B29C 70/54* (2013.01);
(Continued)

(58) Field of Classification Search
CPC ........ B29B 11/16; B29C 70/382; B29C 70/54
See application file for complete search history.

(56) References Cited

U.S. PATENT DOCUMENTS 4,541,886 A * 9/1985 Marlow ............... B29C 70/386
156/230
7,235,149 B2 * 6/2007 Taggart ............... B29C 70/228
156/177
(Continued)

FOREIGN PATENT DOCUMENTS

CN   101492098   7/2009
CN   101678567   3/2010
(Continued)

OTHER PUBLICATIONS

Machine Translation of German pATENT 102011054650, Date Unknown.*
(Continued)

*Primary Examiner* — Jeffry H Aftergut
(74) *Attorney, Agent, or Firm* — Kilpatrick Townsend & Stockton LLP

(57) ABSTRACT

A composite article manufacturing facility comprising: a plurality of forming stations (1), each forming station being capable of forming pieces from a feedstock of a laminar reinforcement material; a plurality of lay-up stations (3), each lay-up station being capable of arranging a stack of the formed pieces in overlapping fashion; a transfer mechanism (2) configured to simultaneously transport formed portions from multiple ones of the forming stations towards multiple ones of the lay-up stations; a memory (93) storing a first sequence of pieces to be laid up at a first one of the lay-up stations and a second sequence of pieces to be laid up at a second one of the lay-up stations; and a controller (90) coupled to the forming stations, the lay-up stations and the transfer mechanism for controlling the operations thereof,
(Continued)

the controller having access to the memory and being configured to, when a formed piece of the first sequence and a formed piece of the second sequence are loaded on the transfer mechanism, cause the transport mechanism to simultaneously transport them towards the first and second lay-up stations respectively.

15 Claims, 2 Drawing Sheets

(51) Int. Cl.
    *B29C 70/38*     (2006.01)
    *B29C 70/18*     (2006.01)
    *B29L 31/30*     (2006.01)

(52) U.S. Cl.
    CPC ............ *B29C 2793/0027* (2013.01); *B29L 2031/3076* (2013.01)

(56) References Cited

U.S. PATENT DOCUMENTS

| | | | |
|---|---|---|---|
| 9,399,338 B1* | 7/2016 | Metschan | ............... B32B 37/02 |
| 2012/0269999 A1* | 10/2012 | Kind | ............... B29C 70/081 |
| | | | 428/34.1 |
| 2013/0306233 A1 | 11/2013 | Pini et al. | |
| 2016/0303839 A1 | 10/2016 | Metschan | |
| 2016/0354951 A1 | 12/2016 | Mai et al. | |
| 2018/0036966 A1* | 2/2018 | Boge | ............... B29C 70/38 |

FOREIGN PATENT DOCUMENTS

| | | |
|---|---|---|
| CN | 101913286 | 12/2010 |
| CN | 102762360 | 10/2012 |
| CN | 103391841 | 11/2013 |
| CN | 103619567 | 3/2014 |
| CN | 103796815 | 5/2014 |
| CN | 105966593 | 9/2016 |
| DE | 102011054650 A1 * | 4/2013 |
| DE | 102011054650 A1 | 4/2013 |

OTHER PUBLICATIONS

Search Report for GB1717317.0 dated Apr. 20, 2018.
Search Report & Written Opinion for PCT/GB2018/053037 dated Jan. 14, 2019.
"Automated Ply Laminating System (APLS)", NTIS Tech Notes, US Department of Commerce. Springfield, VA, US, Nov. 1, 1988, p. 96901/02.
CN Application No. CN201880080049.9 , First Chinese Office Action, with English Translation, dated Sep. 27, 2021, 22 pages.
CN Application No. CN201880080049.9, "Chinese Office Action", dated Apr. 20, 2022, 8 pages.

* cited by examiner

COMPOSITE MANUFACTURING

This invention relates to manufacturing products from composite materials.

An increasing number of relatively large components are being made from composite products. Some examples are tubs for automobiles, wings for aircraft, blades for wind turbines and masts for yachts.

One class of composite materials involves a matrix in which fibres are embedded. The fibres may be in the form of mats, long single lengths or tows, or short fragments. For components that are to have a good strength to weight ratio, a common method of construction is to lay up multiple overlapping layers of fibre mats. The mats are then fixed by setting them in the matrix material. The shapes and orientations of the mats are chosen so that they will impart the desired strength properties to the resulting component. In a region of the component where stresses are expected to be concentrated there may be more thicknesses of material than at lower stress locations. The fibres of the mats may be oriented along the directions of expected tensile stress. In addition to the mats being shaped to provide strength at a specific region of the component, it may also be necessary to cut the mats to allow them to fold around the contours of the component. For example, it may be necessary to cut slashes or darts in a mat to avoid it puckering where it is folded around an interior corner, or to allow it to splay around an exterior corner. As a result of these considerations, in complex parts made according to this construction there may be many hundreds of differently shaped mats that are laid up at different locations in a single component.

In order to automate this process it is necessary to cut the various pieces of fibre mat to shape. Conventionally the pieces are cut from rolls. There may be multiple different types of roll used in a single component, which may differ in weight, fibre orientation, how the fibres are held together and so on. Once the pieces are cut they are stacked ready to be laid up. For complex components, and in factories that are making multiple different parts, this can require a considerable amount of storage space; and when a part is to be manufactured, collecting the parts required for that takes time.

There is a need for an improved way of manufacturing composite components.

According to one aspect there is provided a composite article manufacturing facility comprising: a plurality of forming stations, each forming station being capable of forming pieces from a feedstock of a laminar reinforcement material; a plurality of lay-up stations, each lay-up station being capable of arranging a stack of the formed pieces in overlapping fashion; a transfer mechanism configured to simultaneously transport formed portions from multiple ones of the forming stations towards multiple ones of the lay-up stations; a memory storing a first sequence of pieces to be laid up at a first one of the lay-up stations and a second sequence of pieces to be laid up at a second one of the lay-up stations; and a controller coupled to the forming stations, the lay-up stations and the transfer mechanism for controlling the operations thereof, the controller having access to the memory and being configured to, when a formed piece of the first sequence and a formed piece of the second sequence are loaded on the transfer mechanism, cause the transport mechanism to simultaneously transport them towards the first and second lay-up stations respectively.

According to a second aspect there is provided a method for manufacturing a composite article comprising: forming, at each of a plurality of forming stations, a plurality of pieces from feedstocks of laminar reinforcement material; simultaneously transporting formed portions from multiple ones of the forming stations towards multiple ones of the lay-up stations; and laying up, at a plurality of lay-up stations, stacks of the formed pieces in overlapping fashion.

The step of transporting may be performed by means of a single material handling device.

According to a third aspect there is provided a method of operating a composite article manufacturing facility comprising: a plurality of forming stations, each forming station being capable of forming pieces from a feedstock of a laminar reinforcement material; a plurality of lay-up stations, each lay-up station being capable of arranging a stack of the formed pieces in overlapping fashion; a transfer mechanism configured to simultaneously transport formed portions from multiple ones of the forming stations towards multiple ones of the lay-up stations; the method comprising, when a formed piece of the first sequence and a formed piece of the second sequence are loaded on the transfer mechanism, causing the transport mechanism to simultaneously transport them towards the first and second lay-up stations respectively. The method may comprise storing a first sequence of pieces to be laid up at a first one of the lay-up stations and a second sequence of pieces to be laid up at a second one of the lay-up stations.

The forming stations may be arranged in a first row. The lay-up stations may be arranged in a second row alongside the first row. The transfer mechanism may be disposed between the first and second rows.

The transfer mechanism may be elongate along a direction in which the first and second rows extend. The transfer mechanism may be a linear conveyor.

The transfer mechanism may be operable in two directions, to move pieces from either end of the first row towards the respective opposite end of the second row.

The transfer mechanism may be a conveyor belt.

The controller may be configured to cause the forming stations to form pieces and cause the transport mechanism to transport those pieces so as to cause the pieces to be made available in the first and second sequences to the first and second lay-up stations respectively.

The controller may be configured to vary the direction in which pieces are conveyed by the transfer mechanism so as to cause the pieces to be made available in the first and second sequences to the first and second lay-up stations respectively.

The controller may be configured to cause the forming stations to place the formed pieces in non-overlapping fashion on the transfer mechanism.

The controller may be configured to cause multiple ones of the forming stations to simultaneously form multiple pieces of the first sequence.

The controller may be configured to cause multiple ones of the forming stations to simultaneously form multiple pieces of the first and second sequences.

The facility may comprise one or more stations configured for infusing resin into a stack of the pieces.

At least one of the forming stations may be capable of cutting the pieces from a feedstock of a laminar reinforcement material.

The transfer mechanism may comprise a first manipulator located so as to be capable of picking up formed pieces at a forming station and a second manipulator located so as to be capable of laying up formed pieces at a lay-up station, the second manipulator being located so that it can grip a formed piece being held by the first manipulator.

The controller may be configured to cause one or both of the first and second manipulators to invert a formed piece so as to cause it to be laid up in the opposite orientation about a horizontal axis to the orientation in which it is formed.

The said formed piece may be the first or last piece of a stack of pieces. The said piece may be the uppermost or lowermost of such a stack.

The present invention will now be described by way of example with reference to the accompanying drawings. In the drawings.

Figure 1:
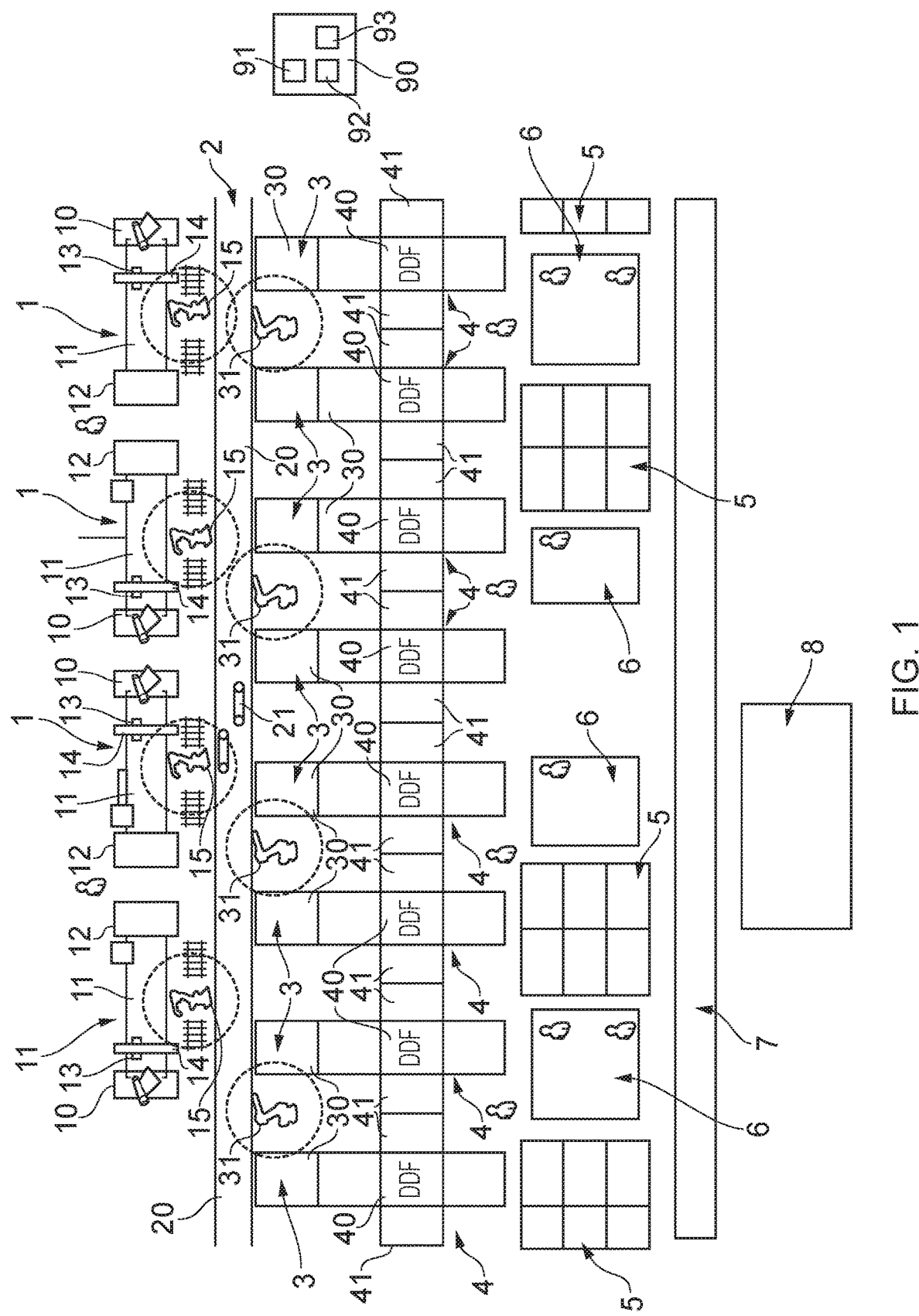
FIG. 1 is a schematic view of part of a manufacturing plant.

FIG. 1 illustrates an example layout for a manufacturing plant. The plant is configured to cut pieces from generally laminar feedstock (e.g. from rolls of pliable, woven reinforcing fibre sheet) and to lay those pieces up in overlapping fashion to collectively form reinforcement for a composite component. The plant is arranged so that multiple pieces can be cut and laid up simultaneously. There are multiple cutting stations 1, which may use different feedstocks; and multiple lay-up stations 3, which may lay up different components or sub-components. Between the cutting stations and the lay-up stations is a transport mechanism 2. In this instance the transport mechanism is a conveyor belt. The cutting stations are arranged in a row. The lay-up stations are arranged in a row. The transport mechanism extends between those rows to distribute cut pieces of reinforcement to the lay-up stations. This can result in a highly efficient process, particularly when components or sub-components of many different types, and material sequences, are to be made. The rows may be straight or curved.

The plant of FIG. 1 is intended for manufacturing composite components. In summary, the components are made by the following steps.

1. Rolls of reinforcing fibre fabric are cut so as to form mats of desired shapes.

2. Groups of mats are laid up in relationship to each other and formed into sub-elements. The sub-elements may be semi-hardened in non-planar shapes, as will be described further below.

3. Groups of sub-elements are positioned together in a mould.

4. The mould is closed and resin is infused around the sub-elements. The resin is cured to form the final rigid component. The component is removed from the mould.

In general, workflow is from the upper part of FIG. 1 to the lower part. The workstations shown in FIG. 1 comprise cutting stations 1, a mat distribution station 2, lay-up stations 3, initial forming stations 4, assembly stations 6, and a resin infusion station 8.

In FIG. 1 there are four cutting stations 1. The purpose of each cutting station is to cut portions of fibre sheet mat into mats of predetermined shapes and to dispense those mats. Each cutting station has a feed roll 10 of fibre sheet material. The material extends over a cutting table 11 to a take-up roll 12. The take-up roll can be driven by a motor to advance the material over the table. A cutting head 13 is movable over the table. The cutting head has a cutting device for cutting the fibre material. The cutting device could be a knife, a laser or an abrasive beam unit. The cutting head is movable under computer control to cut the sheet on the table into mats of a predetermined shape. Once the sheet on the table has been cut, it can be advanced on to the take-up roll to expose fresh fabric on the table. The computer that controls the cutting station is shown at 90.

Each cutting station may hold a different feedstock from any one or more of the other cutting stations, or from all the other cutting stations; or two or more of the cutting stations may hold the same feedstock. The feedstock provided at each cutting station can be chosen so that collectively the cutting stations are capable of providing all the materials needed to form the mats intended to make up the final product. Once the constituent materials of the mats of the final product have been determined, rolls 10 of suitable feedstocks to form that final product can be installed at the cutting stations. If the plant is intended to form multiple final products then feedstocks sufficient to make all those products can be installed at the cutting stations.

The cutting head could be movable over the table by being mounted on a beam 14 which can traverse the table in the direction between the feed and take-up rolls. The head could be mounted on the beam in such a way that it can move along the length of the beam. Motors could be provided to move the beam and to move the head on the beam.

Each cutting station has a manipulator 15. For example, it could be a manipulator having multiple linear and/or rotational degrees of freedom. In this example the manipulators are robot arms. Each robot arm is configured so as to be capable of picking up cut mats from its cutting table and placing the mats on a distribution belt 20 at the mat distribution station 2. The robot arm may have jaws at its distal end for engaging cut mats. More generally, the jaws could be any suitable gripping end effector, for example a mechanical gripper, a hook or prong or a vacuum gripper. There may be multiple robot arms at each cutting station, to help hold the mats in such a way that they drape flat when being lifted. Each robot arm may be provided with multiple pairs of jaws. Robots for moving mats from the cutting tables to the transfer mechanism could be shared between cutting stations.

The cutting stations are arranged side-by side. The row of cutting stations extends generally linearly. The distribution belt 20 extends along, and preferably adjacent to, the row of cutting stations, so that each of the robot arms 15 can distribute mats on to the belt.

The distribution belt is capable of being driven to move along its length by a drive unit 21. The drive unit 21 can drive the belt to move in either direction. Conveniently, the distribution belt is an endless belt. Alternatively it could be a reciprocating table. In another alternative it could be provided by a series of hangers each mounted on an endless loop, and individual mats could be clasped by a respective hanger. In another alternative it could be provided by a series of tables, and individual tables could carry individual mats or group of mats whilst each table could be powered independently and move independently from other tables and in both directions. Preferably the transport mechanism provides an upward facing and/or generally horizontal surface on which mats can be supported. That surface may be movable horizontally along the rows of the cutting and/or lay-up stations.

Also arranged along the distribution belt are the lay-up stations 3. Each lay-up station has a lay-up table 30. A series of lay-up manipulators 31 are located so that they can pick up mats from the distribution belt and position them on one the lay-up tables. In this example the manipulators 31 are robot arms. In order to lay up the mats to form a specific sub-element, one of the robots 31 picks up the mats to form that element in turn and lays them up in a stack on one of the lay-up tables. This involves selecting the appropriate mats from the belt, turning them each into the appropriate orientation and then putting them down on the lay-up table in the appropriate translational relationship relative to the other mats of the stack. Robots for moving mats from the transfer mechanism to the lay-up stations could be shared between lay-up stations.

An adhesive, preferably a weak tackifier, may be dispensed between layers of the stack to help hold the mats in place relative to each other. Adhesive may be pre-applied to one or both sides of some or all of the mats.

In one convenient arrangement, the material(s) from which all the mats of a stack are made is/are coated before the lay-up process begins on only a single side with an adhesive. Thus, before it is laid up into the stack, each cut mat has a coating of adhesive on one side, and is substantially free of adhesive on its other side. The mats are laid up so that there is a layer of the pre-applied adhesive between the fibre material of each mat and the fibre material of the adjacent mat(s). This arrangement provides a convenient way of holding the stack together. Typically, the stack will be built upwards from a mat whose lower surface is substantially free of adhesive. If all the layers of the stack have the same orientation and are all pre-coated with adhesive then an end surface of the stack will carry exposed adhesive. This can make the stack difficult to store, and the exposed adhesive may stick to subsequent forming equipment such as diaphragm formers. It is desirable for both end faces to be substantially free of adhesive. One way to achieve this is for the mat on one end face to not be pre-coated with adhesive. However, that may require it to be formed of a different material from other layers of the stack. Another approach is to invert one or more of the uppermost layers of the stack relative to the other layers of the stack. Conveniently only the upper layer is inverted. It is preferred not to store the upper layer mat in the inverted configuration since then it might stick to a surface on which it is resting prior to lay-up. A convenient approach is to position the manipulator 31 of the lay-up station sufficiently close to the manipulator 15 of a cutting station that the manipulator 31 can grip a mat that is being suspended by the manipulator 15. In that arrangement the lay-up manipulator 31 can take hold of a mat being held by the cutting manipulator 15 without the mat resting on a surface. This allows one or both of the manipulators to conveniently invert the mat before placing it on the stack, without the mat having rested on a surface in the inverted configuration.

Once the stack to form a specific sub-element is complete the stack is moved to a double diaphragm forming (DDF) station 4. This may be done by another robot (not shown in FIG. 1) or manually. The purpose of the DDF station is to implement an initial forming of the stack into roughly the shape it is to adopt in the final component. It does this by drawing the stack against a rigid former in DDF unit 40 in the presence of heat, and then cooling the stack. The heat causes an adhesive present in the stack to set, fixing the stack in the shape imposed by the rigid former. The adhesive may be pre-impregnated into the fabric from which the mats are cut, or it may be applied to the cut mats before or after laying up.

The sub-elements may have different shapes. To allow one DDF unit 40 to readily form any of a number of sub-elements, the DDF station may be provided with a library of rigid formers, indicated at 41. When a particular sub-element is to be formed, the appropriate former can be picked from the library and installed in a DDF unit.

Once the adhesive has set the stack in shape the resulting sub-element can be removed from the DDF unit. This may be done by another robot (not shown in FIG. 1) or manually. The formed sub-elements may be stored in a holding area 5.

The sub-elements will be formed into the final component in a moulding station 8. Before that is done, the sub-elements are assembled together in or on a rigid mould element. This can be done at assembly station 6. For example, in the case of a vehicle tub, there may be sub-elements for the floor pan, the front bulkhead, the rear bulkhead, the sills and a transverse bulkhead. Having been formed separately, these sub-elements can be brought together at station 6 in a mould sized to form the entire tub.

Once the sub-elements have been assembled in or on to a mould, the mould is transported by a carrier system 7 to the moulding station 8. The moulding station may, for example, employ resin transfer moulding (RTM). The mould volume containing the sub-elements may be closed, and then a vacuum may be drawn in the mould volume. Then resin may be injected into the mould volume. Once the resin is fully injected the moult may be heated to cause the resin to harden.

Once the matrix material has hardened, the resulting component can be removed from the mould.

Some or all of the stations may operate under the control of a computer 90. The computer comprises a program memory 91, a processor 92 and a design memory 93. The program memory stores in a non-transient way code executable by the processor 92 to cause the computer 90 to perform its functions. The design memory 93 stores in a non-transient way information defining the shapes of the mats to be cut, which materials they are to be cut from, and how they are to be laid up to form stacks (i.e. in which order and their relative orientation and position) and for which sub-elements.

The final component may be formed of a substantial number of sub-elements: for example more than 10, 20 or 30 sub-elements. To allow these to be formed efficiently, without excessive storage of cut mats or sub-elements, the system can operate in the following way.

1. A demand is established for a particular component. This is signalled to the controller 90.

2. The controller establishes from the data in the design memory 93 which sub-elements are required to form that component and which cut mats will be needed to form those sub-elements.

3. The controller allocates sub-elements to respective ones of the lay-up stations 3. If there are sufficient lay-up stations then all the sub-elements can be laid up in parallel. Otherwise, some sub-elements can be formed later, after a lay-up table has been freed up by a stack of laid-up mats proceeding to the DDF station.

4. The controller identifies in the memory 93 the first cut mat to be formed for one of the sub-elements. That mat will be of a material that is available at one of the cutting stations 1. The controller causes that cutting station to cut the mat to the desired shape and causes its robot to place the mat on the distribution belt 20. Other mats may be being cut simultaneously, as will be described further below.

5. The controller causes the distribution belt to move in the appropriate direction and by at least the appropriate distance to convey the cut mat to the lay-up station where it is to be used. The robot at that lay-up station removes the cut mat from the belt and places it in the appropriate orientation and location on the lay-up table.

6. The controller identifies in the memory 93 the next cut mat to be formed for that sub-element. That mat will be of a material that is available at one of the cutting stations 1. The controller causes that cutting station to cut the mat to the desired shape and causes its robot to place the mat on the distribution belt 20. That mat is conveyed to the appropriate lay-up station and laid up analogously to the steps taken for the first cut mat.

7. Once the stack for the sub-element is complete, the stack is transferred to a DDF station and pre-formed as described above.

8. The process proceeds similarly, and where possible in parallel, to form the other sub-elements required to make the component.

9. If necessary, the controller 90 causes the appropriate RTM mould to form the component to be put in place.

10. The formed sub-elements are laid up in the RTM mould, and then undergo the RTM process to form the completed component.

When multiple elements (or sub-elements of a larger element) are to be laid up, the controller reads from memory 93 the sequences of materials to be used to lay-up those elements/sub-elements. The controller has knowledge of the relative positions of the cutting stations and the lay-up stations. That knowledge may be pre-programmed into memory 93. The controller also has knowledge of which cutting station has access to which material. That knowledge may be pre-programmed into memory 93 or the controller may have caused the respective cutting stations to be loaded with the materials required to make the desired elements/sub-elements. The controller determines which lay-up stations are to lay up which of the elements/sub-elements. This may be done programmatically by the controller, e.g. in such a way as to result in efficient distribution of cut mats, or it may be pre-programmed into memory 93. The controller 93 then executes a program stored in the program memory 91 to determine the order in which the cutting stations should cut mat parts to form the elements/sub-elements, and the direction and distance the transport mechanism should convey those parts to distribute them to the appropriate lay-up stations. It does this in dependence on the relative locations of the cutting stations and the lay-up stations, the materials available at respective cutting stations, the lay-up stations to which particular elements/sub-elements have been allocated and the sequences of materials in the desired elements/sub-elements. This may result in multiple parts being cut simultaneously on different cutting stations, optionally from different materials. One input to the controller 93 may be an indication of the demand for particular cut mat parts from downstream components of the process. This may be determined in advance from production planning, or it may be generated during operation, for example in response to a defective cut mat part being rejected by a downstream process, resulting in a demand for a replacement part. If that were to happen then the controller may schedule repeat production of the rejected item. In this way the system can implements a lean manufacturing system, manufacturing only those cut parts that are required, and at the required times. It may result in multiple parts being transported simultaneously on the transport mechanism in a direction from the station where they were cut towards a lay-up station where they will be unloaded from the transport mechanism and laid up. This can result in efficient operation of the plant since cutting, lay-up and transport for different elements/sub-elements can take place simultaneously. The cutting stations are shared between the lay-up stations. Material from each cutting station can be distributed automatically to multiple lay-up stations.

The parallel operating aspects of the process will now be described in more detail.

Multiple cut mats may be on the transfer belt 20 at the same time. When the transfer belt shifts to the left as shown in FIG. 1, it can simultaneously transport cut mats from multiple cutting stations towards multiple lay-up stations. The controller 90 can cause multiple ones of the cutting stations to cut mats at the same time, and to load them on to the belt so they are simultaneously on the belt. With correct ordering of the cutting tasks cut mats can be conveyed to the lay-up stations to arrive in the desired order without the transfer belt 20 having to make a separate movement for each cut mat. This means that the cutting stations can be operating at a high duty cycle.

It is preferred that the cut mats arrive at a lay-up station in the order in which they are to be stacked, the lowest mat in the stack arriving first. However, utilisation of the cutting stations may be maximised by delivering the cut mats to the lay-up station out of that order. In that case, one option is for the robot at the lay-up station to pick the out-of-order mat from the transfer belt and store it temporarily on the lay-up table at a location offset from the existing stack until it is required. Then it can be picked up from the table and moved onto the stack. Another option is for the robot at the lay-up station to leave the cut mat on the transfer belt until it is needed.

Preferably the controller 90 maintains a record of which cut mat is at which location on the belt, and the positional configuration of the belt. This allows the controller to (a) cause the robots at the cutting stations to place newly cut mats at vacant locations on the transfer belt and (b) direct the robots at the lay-up stations to pick the cut mats from the appropriate location on the belt.

Preferably, the controller directs the cutting stations, the lay-up stations and the transfer belt to cut and position mats so that lay-up can take place at multiple lay-up stations simultaneously. Stacks for forming different sub-elements may be being formed on different lay-up tables at the same time. If the lay-up table is large enough relative to a stack, multiple stacks could be formed on a lay-up table at the same time.

Figure 2:
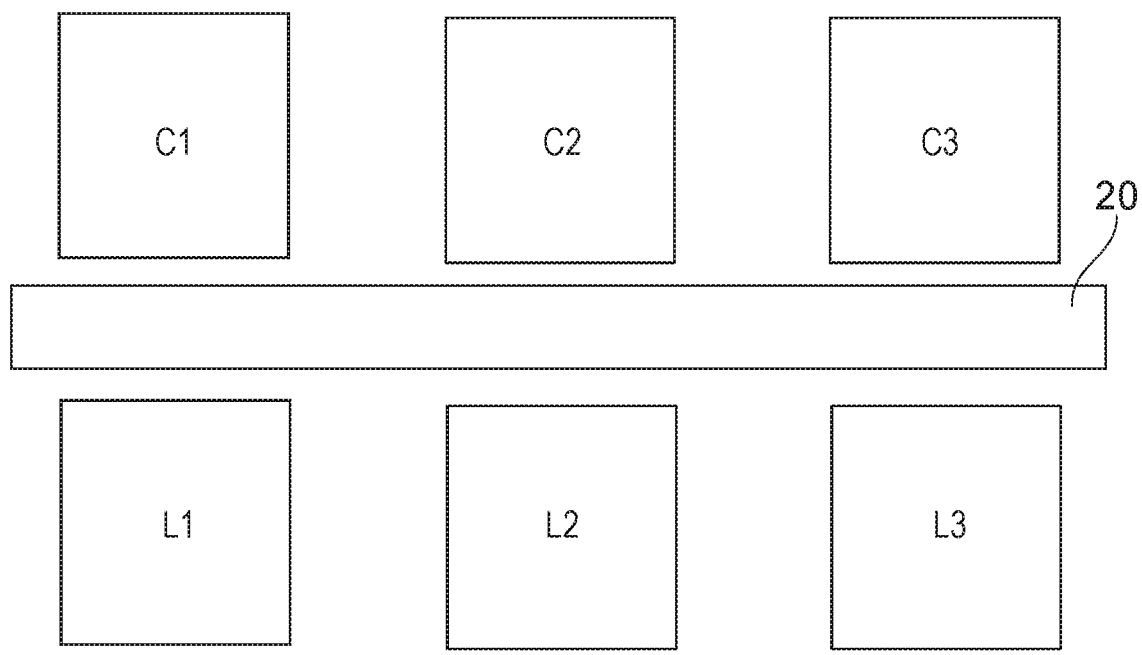
FIG. 2 illustrates manufacturing stations.

To illustrate the process, suppose there are three cutting stations (C1, C2 and C3) arranged in order, with each cutting station opposite a respective one of three lay-up stations (L1, L2 and L3) and with a transfer belt 20 running between the cutting stations and the lay-up stations. This is illustrated in FIG. 2. Suppose stations C1, C2 and C3 are set up to cut materials A, B and C respectively, and suppose the stacks to be laid up have the following material layers in order:

Stack 1 (to be laid up at L1): A, B, B
Stack 2 (to be laid up at L2): B, C, C, A
Stack 3 (to be laid up at L3): C, B
The controller can direct the following steps:
simultaneously: C1 cuts the first mat for L1, C2 cuts the first mat for L2, C3 cuts the first mat for L3, and those mats are moved to the transfer belt
without the belt having moved, those mats are moved to the respective lay-up stations
simultaneously: C2 cuts the second mat for L1, C3 cuts the second mat for L2 and those mats are moved to the transfer belt
the transfer belt moves left one station, taking those mats to sit adjacent the appropriate lay-up stations, and the mats are moved to the appropriate lay-up stations
simultaneously: C2 cuts the third mat for L1, C3 cuts the third mat for L2 and those mats are moved to the transfer belt
the transfer belt moves left one station, taking those mats to sit adjacent the appropriate lay-up stations, and the mats are moved to the appropriate lay-up stations simultaneously: C2 cuts the second mat for L3, C1 cuts the fourth mat for L2 and those mats are moved to the transfer belt the transfer belt moves right one station, taking those mats to sit adjacent the appropriate lay-up stations, and the mats are moved to the appropriate lay-up stations In this way the cutting stations can be simultaneously cutting mats for different stations, which will in due course be moved to the lay-up stations by the transfer belt. The shapes of mat cut at each step may be the same or different.

The controller may be pre-programmed with the sequence of cutting and belt movement operations needed to efficiently form the mats and transport them to the lay-up stations. Alternatively, it could be programmed to determine a suitable or efficient sequence of cutting and belt movements from knowledge of the materials available at the cutting stations, their relative positions along the belt, and the sequence of materials required to lay up each required sub-component. The controller may be implemented by a single computer or may be distributed between multiple computers.

The materials used in the process may be of any suitable form. For example, the mats may be of a fibre having a high tensile strength. The mats may comprise, for example, glass fibre, carbon fibre, polymer fibre (e.g. an aramid fibre). The matrix may comprise a polymer such as epoxy. Fibres comprising the mats may be woven, knitted, welded or glued together to form the mats. The mats may optionally be pre-impregnated with an adhesive. The mats at each cutting station may be the same, or may differ in any one or more of weight (i.e. weight per unit area), thickness, tensile strength, stiffness and relative orientation of the constituent fibres thereof.

The shaping process performed after lay-up may be double-diaphragm forming, single-diaphragm forming, flop moulding, pressing or any other suitable process. Or that shaping process may be omitted.

The moulding process may be resin transfer moulding or any other suitable moulding process.

There may be multiple transfer belts 20 within reach of the robot arms at the cutting and lay-up stations. In one operating mode, one such belt could travel in one direction and the other such belt could travel in the opposite direction, for at least part of the time when the plant is operational. This may allow for particularly efficient scheduling of the cutting operations. Instead of belts, the transfer of the mats from cutting stations to lay-up stations could be provided by trollies, mobile robots or robot arms, air tables or a series of movable hangers on which mats can be suspended. The movable hangers could move along a linear path.

It is convenient for the cut mats to be laid up on horizontal tables, but they could be laid up in overlapping fashion in other ways, for example by being pinned on to upstanding walls or hung from a common hanger.

In the examples given above, the cutting stations form the mat pieces that are to be laid up by cutting them from sheets or rolls of material. More generally, the cutting stations can be considered to be forming stations, and the mat pieces could be formed in other ways. The mat pieces, or material blanks, could be formed in other ways. For example, they could be laid up, woven, knitted or stitched together on demand by a forming station. The forming station could employ an additive layup technology such as tailored fibre placement, 3D weaving, automated fibre placement or automated tape laying.

In the plant of FIG. 1 the individual mats are formed into sub-components and the sub-components are assembled together to form an overall component. For simpler components, the mats could be assembled directly to form the overall component.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for manufacturing a composite article comprising:
    forming, at each of a plurality of forming stations, a plurality of pieces from feedstocks of laminar reinforcement material;
    simultaneously transporting formed pieces from multiple ones of the forming stations towards multiple lay-up stations, each lay-up station being capable of arranging a stack of the formed pieces in overlapping fashion; and
    laying up, at the plurality of lay-up stations, stacks of the formed pieces in overlapping fashion;
    wherein the step of transporting is performed by means of a single material handling device;
    wherein the single material handling device is a conveyor belt;
    wherein a plurality of cutting manipulators distribute formed pieces from the forming stations on to the single material handling device, and a plurality of lay-up manipulators distribute formed pieces from the single material handling device on to at least one of the lay-up stations.

2. A composite article manufacturing facility comprising:
    a plurality of forming stations, each forming station being capable of forming pieces from a feedstock of a laminar reinforcement material;
    a plurality of lay-up stations, each lay-up station being capable of arranging a stack of the formed pieces in overlapping fashion;
    a transfer mechanism configured to simultaneously transport formed pieces from multiple ones of the forming stations towards multiple ones of the lay-up stations, wherein the transfer mechanism is a conveyor belt;
    a plurality of cutting manipulators, each cutting manipulator being capable of distributing formed pieces from the forming stations on to the transfer mechanism;
    a plurality of lay-up manipulators, each lay-up manipulator being capable of distributing formed pieces from the transfer mechanism on to at least one of the lay-up stations;
    a memory storing a first sequence of pieces to be laid up at a first one of the lay-up stations and a second sequence of pieces to be laid up at a second one of the lay-up stations; and
    a controller coupled to the forming stations, the lay-up stations and the transfer mechanism for controlling the operations thereof, the controller having access to the memory and being configured to, when a formed piece of the first sequence and a formed piece of the second sequence are loaded on the transfer mechanism by the cutting manipulators, cause the transfer mechanism to simultaneously transport them towards the first and second lay-up stations respectively.

3. A composite article manufacturing facility as claimed in claim 2, wherein the forming stations are arranged in a first row, the lay-up stations are arranged in a second row alongside the first row and the transfer mechanism is disposed between the first and second rows.

4. A composite article manufacturing facility as claimed in claim 3, wherein the transfer mechanism is elongate along a direction in which the first and second rows extend.

5. A composite article manufacturing facility as claimed in claim 3, wherein the transfer mechanism is operable in two directions, to move pieces from either end of the first row towards the respective opposite end of the second row.

6. A composite article manufacturing facility as claimed in claim 2, wherein the controller is configured to cause the forming stations to form pieces and cause the transfer mechanism to transport those pieces so as to cause the pieces to be made available in the first and second sequences to the first and second lay-up stations respectively.

7. A composite article manufacturing facility as claimed in claim 6, wherein the controller is configured to vary the direction in which pieces are conveyed by the transfer mechanism so as to cause the pieces to be made available in the first and second sequences to the first and second lay-up stations respectively.

8. A composite article manufacturing facility as claimed in claim 2, wherein the controller is configured to cause the forming stations to place the formed pieces in non-overlapping fashion on the transfer mechanism.

9. A composite article manufacturing facility as claimed in claim 2, wherein the controller is configured to cause multiple ones of the forming stations to simultaneously form multiple pieces of the first sequence.

10. A composite article manufacturing facility as claimed in claim 2, wherein the controller is configured to cause multiple ones of the forming stations to simultaneously form multiple pieces of the first and second sequences.

11. A composite article manufacturing facility as claimed in claim 2, comprising one or more stations configured for infusing resin into a stack of the pieces.

12. A composite article manufacturing facility as claimed in claim 2, wherein at least one of the forming stations is capable of cutting the pieces from a feedstock of a laminar reinforcement material.

13. A composite article manufacturing facility as claimed in claim 2, wherein the transfer mechanism comprises a first manipulator located so as to be capable of picking up formed pieces at a forming station and a second manipulator located so as to be capable of laying up formed pieces at a lay-up station, the second manipulator being located so that it can grip a formed piece being held by the first manipulator.

14. A composite article manufacturing facility as claimed in claim 13, wherein the controller is configured to cause one or both of the first and second manipulators to invert a formed piece so as to cause it to be laid up in the opposite orientation about a horizontal axis to the orientation in which it is formed.

15. A composited article manufacturing facility as claimed in claim 14, wherein the said formed piece is the first or last piece of a stack of pieces.

* * * * *